United States Patent
Lokhandwalla

(10) Patent No.: US 12,012,918 B1
(45) Date of Patent: Jun. 18, 2024

(54) SYSTEMS AND METHODS FOR COKING MITIGATION IN FUEL SUPPLY SYSTEMS

(71) Applicant: Hamilton Sundstrand Corporation, Charlotte, NC (US)

(72) Inventor: Murtuza Lokhandwalla, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/161,031

(22) Filed: Jan. 27, 2023

(51) Int. Cl.
  *C10L 10/04* (2006.01)
  *F02M 65/00* (2006.01)

(52) U.S. Cl.
  CPC .......... *F02M 65/007* (2013.01); *C10L 10/04* (2013.01); *C10L 2290/06* (2013.01)

(58) Field of Classification Search
  CPC .... F02M 65/007; C10L 10/04; C10L 2290/06
  See application file for complete search history.

(56) References Cited

U.S. PATENT DOCUMENTS

| | | |
|---|---|---|
| 4,111,369 A | 9/1978 | Sharpe |
| 4,468,127 A | 8/1984 | Agosta |
| 5,317,861 A | 6/1994 | Fox et al. |
| 8,276,388 B2 | 10/2012 | Cayre et al. |
| 10,731,860 B2 | 8/2020 | Donovan et al. |
| 11,052,328 B2 | 7/2021 | Tongue et al. |
| 2007/0130956 A1* | 6/2007 | Chen ............ C10G 31/11 60/723 |
| 2015/0204244 A1* | 7/2015 | Williams ......... F02C 9/40 60/776 |

FOREIGN PATENT DOCUMENTS

| | | |
|---|---|---|
| EP | 3133343 A1 | 2/2017 |
| KR | 101554001 B1 * | 9/2015 |
| KR | 101554001 B1 | 9/2015 |
| WO | WO-2005025718 A1 * | 3/2005 ......... B01D 19/0031 |

OTHER PUBLICATIONS

Extended European Search Report for EP Application No. 24153984.0, dated Apr. 24, 2024, 8 pages.

* cited by examiner

*Primary Examiner* — Ellen M McAvoy
*Assistant Examiner* — Chantel Graham
(74) *Attorney, Agent, or Firm* — Kinney & Lange, P.A.

(57) ABSTRACT

A fuel supply component with coking mitigation includes a housing having a main fuel inlet and a main fuel outlet. The main fuel inlet and outlet define a main fuel flow path therebetween. The housing includes a de-oxygenated fuel inlet in fluid communication with the main fuel flow path downstream from the main fuel inlet. The de-oxygenated fuel inlet is configured and adapted to supply de-oxygenated fuel to the main fuel flow path to mitigate insoluble fuel elements from diffusing and adhering to a wall of the housing.

14 Claims, 2 Drawing Sheets

SYSTEMS AND METHODS FOR COKING MITIGATION IN FUEL SUPPLY SYSTEMS

BACKGROUND OF THE INVENTION

1. Field of the Invention

The present disclosure relates to fuel supply systems and more particularly to . . . .

2. Description of Related Art

In traditional fuel supply systems, fuel flows from a tank, through a fuel system that conditions (pressure/temperature/filter) and meters the fuel flow, and then to a combustor. Typically, fuel is delivered to the combustor by spraying with a fuel nozzle. Generally, these fuel nozzles that spray the fuel into a combustion chamber have intricate and small passages and/or orifices in order to obtain the desired degree of fuel distribution and atomization in the combustion chamber.

Presence of radicals (highly reactive species that tend to react with other species) in jet fuels tend to react with oxygen dissolved in fuel and form insoluble carbonaceous deposits—aka 'coking'—on fuel system surfaces. Coking reactions are accelerated at higher fuel bulk temperatures (>350° F.). With increasing cooling demands and the drive to improve engine thermal efficiency, there is a push to increase fuel bulk temperatures to greater than 350° F., thereby increasing the risk for coking.

In traditional systems, e.g. that shown in FIG. 3, insoluble coking deposits are generally formed either in the bulk of the fuel or in the vicinity of the wall. In either case these deposit diffuse to the wall of the fuel nozzle and adhere to it. Due to its proximity to the combustor, fuel nozzles generally have the highest temperature and smallest passages in a fuel system, and hence most prone to coking deposition. Existing solutions to prevent coking of hot fuels, have either a limited effect or are size/weight/cost prohibitive. For example, a change in nozzle design to minimize recirculation and residence time has had limited success. Eliminating dissolved $O_2$ in jet fuel is effective only if the $O_2$ removal exceeds 90%. However, such a deoxygenating system, when sized for a single-aisle jet engine burn flow, would likely be too large in size/weight/cost and will not trade favorably. Thus, traditional fuel systems tend to limit bulk fuel and wetted wall temperatures, reducing the availability of efficiency improvements due to higher bulk fuel temperatures.

The conventional techniques have been considered satisfactory for their intended purpose. However, there is an ever present need for improved coking mitigation in fuel supply systems. This disclosure provides a solution for this need.

SUMMARY OF THE INVENTION

A fuel supply component with coking mitigation includes a housing having a main fuel inlet and a main fuel outlet. The main fuel inlet and outlet define a main fuel flow path therebetween. The housing includes a de-oxygenated fuel inlet in fluid communication with the main fuel flow path downstream from the main fuel inlet. The de-oxygenated fuel inlet is configured and adapted to supply de-oxygenated fuel to the main fuel flow path to mitigate insoluble fuel elements from diffusing and adhering to a wall of the housing.

In some embodiments, the fuel supply component is a heat exchanger and/or a fuel nozzle. In embodiments where the fuel supply component is a fuel nozzle, the de-oxygenated fuel inlet can be in fluid communication with at least one de-oxygenated fuel conduit which opens into a converging portion of the fuel nozzle, a neck portion of the fuel nozzle, and/or a diverging portion of the fuel nozzle. The neck portion can have a smaller radial dimension than an upstream portion of the fuel supply component and a downstream portion of the fuel supply component.

In some embodiments, the fuel supply component is a heat-sink heat exchanger having a main fuel input flow path. The de-oxygenated fuel inlet can open into the main fuel input flow path.

In accordance with another aspect, a fuel supply system includes coking mitigation. The fuel supply system includes a fuel tank, and an oxygen removal system downstream from the fuel tank. The oxygen removal system is configured and adapted to receive and de-oxygenate a portion of fuel from the fuel tank. The fuel supply system includes a fuel supply component downstream from the oxygen removal system and the fuel pump assembly. The fuel supply component includes a housing having a main fuel flow inlet and at least one de-oxygenated fuel inlet. The de-oxygenated fuel inlet is configured and adapted to supply de-oxygenated fuel to mitigate insoluble fuel elements from diffusing and adhering to a wall of the housing.

In some embodiments, the fuel supply component is a heat exchanger, a fuel nozzle, and/or any fuel carrying conduit. The system can include second fuel supply component downstream from the oxygen removal system and the fuel tank. The first fuel supply component can be a heat exchanger and wherein the second fuel supply component is a fuel nozzle.

In some embodiments, the fuel supply component is a fuel nozzle. When the fuel supply component is a fuel nozzle, the de-oxygenated fuel inlet can be in fluid communication with at least one de-oxygenated fuel conduit which opens into a converging portion of the fuel nozzle, or a neck portion of the fuel nozzle. The neck portion can have a smaller radial dimension than an upstream portion of the fuel supply component and a downstream portion of the fuel supply component. The fuel supply component can be a heat-sink heat exchanger having a main fuel input flow path. The at least one de-oxygenated fuel inlet can open into the main fuel input flow path.

In accordance with another aspect, a method for mitigating coking in a fuel supply system includes providing a first portion of fuel from a fuel tank to an oxygen removal system and a second portion of fuel from the fuel tank to a fuel supply component, de-oxygenating the first portion of fuel with the oxygen removal system to generate a de-oxygenated fuel stream, and providing the de-oxygenated fuel stream to a de-oxygenated fuel inlet of the fuel supply component. The fuel supply component includes a housing having a main fuel flow inlet and the de-oxygenated fuel inlet. The method includes providing the second portion of fuel to the main fuel flow inlet of the housing. The de-oxygenated fuel stream is configured to generate a barrier of de-oxygenated fuel within the housing mitigate insoluble fuel elements from the second portion of fuel from diffusing and adhering to a wall of the housing.

In some embodiments, the first portion of fuel is less than the second portion of fuel. The fuel supply component can be at least one of a heat exchanger or a fuel nozzle. The fuel supply component can be a first fuel supply component. The method can include providing a second fuel supply component downstream from the oxygen removal system with a portion of the de-oxygenated fuel stream. The first fuel supply component can be a heat exchanger and the second fuel supply component can be a fuel nozzle.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
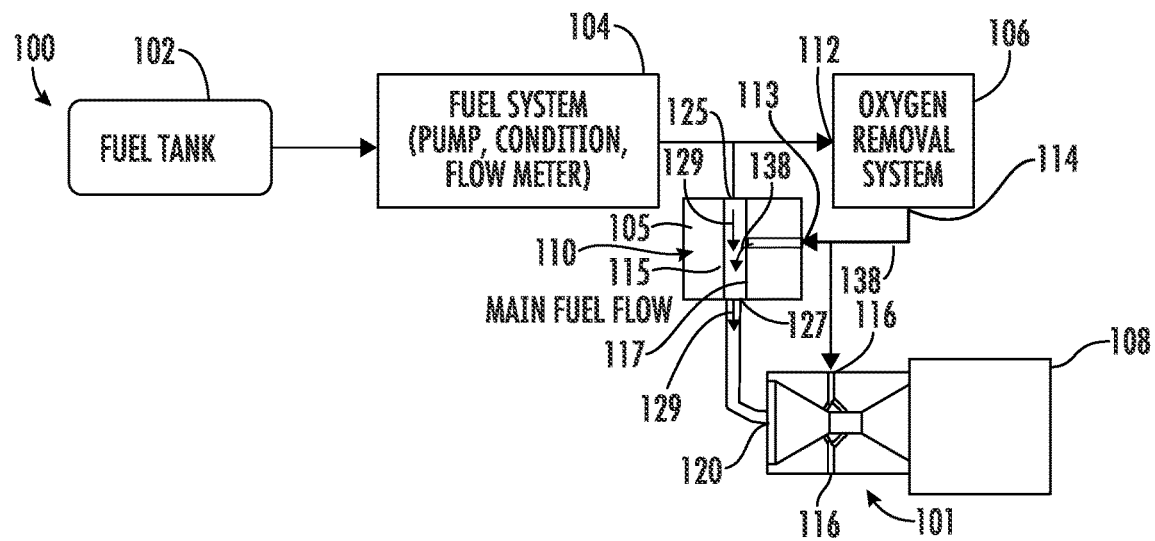
FIG. 1 is a schematic depiction of a fuel supply system constructed in accordance with an embodiment of the present disclosure, showing de-oxygenated fuel flow being supplied from an oxygen removal system to a fuel nozzle.

Reference will now be made to the drawings wherein like reference numerals identify similar structural features or aspects of the subject disclosure. For purposes of explanation and illustration, and not limitation, a schematic view of an exemplary embodiment of the a fuel supply system constructed in accordance with the disclosure is shown in FIG. 1 and is designated generally by reference character 100. Other embodiments of the fuel supply system and/or the fuel supply component in accordance with the disclosure, or aspects thereof, are provided in FIG. 2 as will be described. The systems and methods described herein can be used to reduce and/or prevent the insoluble elements in a bulk fuel supply from diffusing and adhering to fuel supply component walls.

As shown in FIG. 1, a fuel supply system 100 with coking mitigation includes a fuel tank 102 and a fuel pump assembly 104 downstream from fuel tank 102, and an oxygen removal system 106 downstream from fuel pump assembly 104. Oxygen removal system 106 is configured and adapted to receive and de-oxygenate a portion of fuel from fuel pump assembly 104 at an inlet 112. The portion sent to inlet 112 for de-oxygenation flows through a parallel flow path via oxygen removal system 106. The portion sent to oxygen removal system 106 is a small portion (about 1-10%) of the burn flow from fuel tank 102. That small portion is de-oxygenated to an adequate level (>95%) such that no/minimal depositions are formed. Fuel pump assembly 104 can include a variety of assemblies/devices, including, but not limited to, a fuel pump, heat exchanger, flow metering valves, and the like. Fuel supply system 100 includes at least one fuel supply component downstream from fuel pump assembly 104 and fuel tank 102. In the embodiment of FIG. 1, these fuel supply components are a fuel supply component 101, e.g., fuel nozzle 101, and a fuel supply component 110, e.g., a heat-sink heat exchanger 110. Fuel nozzle 101 is configured and adapted to supply fuel to a combustor 108. Those skilled in the art will readily appreciate that while fuel nozzle 101 and heat-sink heat exchanger 110 are shown as the fuel supply components in system 100, the fuel supply components can be any fuel carrying conduit.

Figure 2:
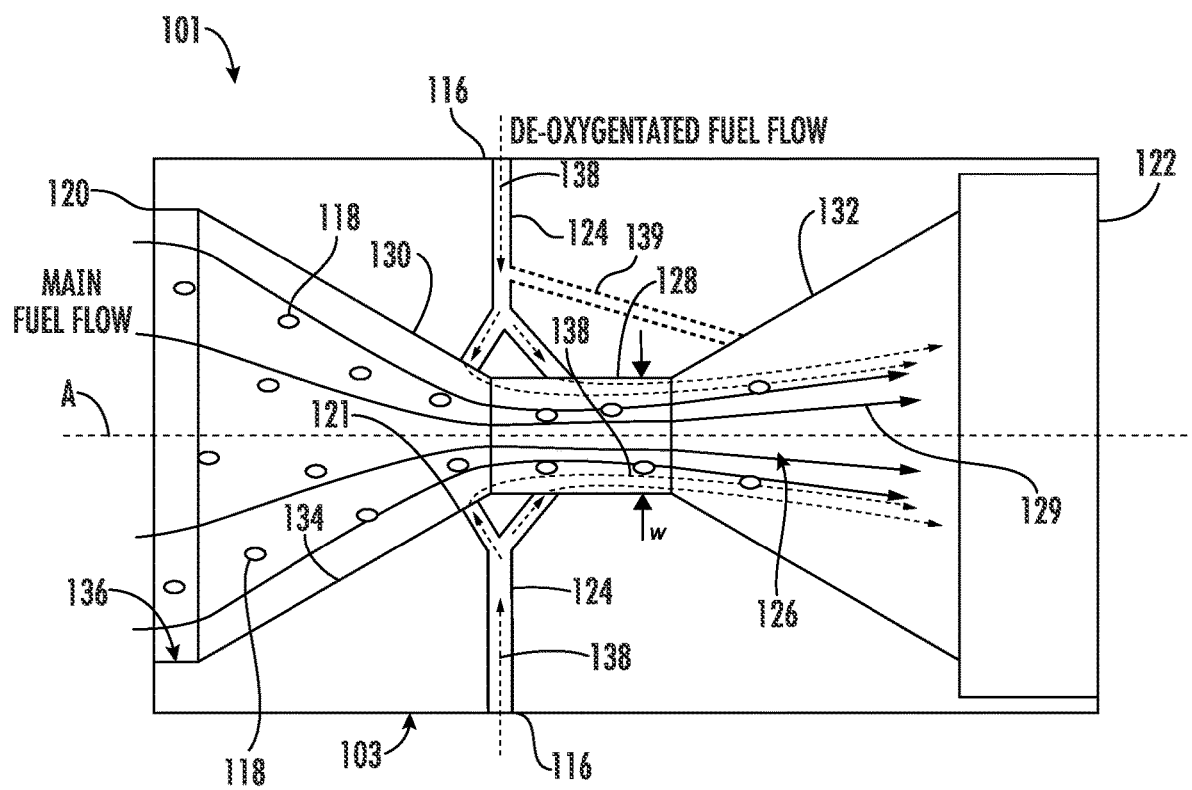
FIG. 2 is a schematic depiction of the fuel nozzle of FIG. 1, showing de-oxygenated fuel flow entering the fuel nozzle.

As shown in FIGS. 1-2, both fuel nozzle 101 and heat-sink heat exchanger 110 are downstream from oxygen removal system 106, fuel tank 102 and fuel pump assembly 104, and are configured to receive a de-oxygenated fuel stream, indicated schematically by arrows 138, from oxygen removal system 106. As shown in FIG. 2, de-oxygenated fuel stream from oxygen removal system 106, indicated schematically by broken-line arrows 138 in FIG. 2 to distinguish from main fuel flow, is introduced via outlets 121 located at various axial locations along an orifice (described in more detail below) of nozzle 101. As shown in FIG. 1, a portion of the same fuel stream 138 is supplied to heat-sink heat exchanger 110 via at least one de-oxygenated fuel inlet 113. In both the nozzle 101 and the heat-sink heat exchanger 110, de-oxygenated fuel stream 138 forms a barrier and displaces a main fuel stream 129 and the insoluble particles 118 away from interior surfaces of the heat exchanger 110 and/or nozzle 101, described in more detail below. This barrier acts to mitigate coking along the interior walls/conduits of the heat exchanger 110 and/or nozzle 101, thereby permitting use of hotter fuels (>350 F), which are more desirable from a thermally efficient engine operation. This barrier only requires a small portion of de-oxygenated fuel flow. As such, the size/weight/cost of such a de-oxygenation system will be significantly lower than systems where all fuel is de-oxygenated, making it more commercially favorable. Those skilled in the art will readily appreciate that while both heat-sink heat exchanger 110 and nozzle 101 are shown and described with de-oxygenated fuel stream 138 inputs, it is contemplated that, in some embodiments, only nozzle 101 or only heat exchanger 110 include inputs for stream 138. It is also contemplated that in some embodiments of system 100, heat exchanger 110 may not be present.

With reference now to FIG. 1, heat-sink heat exchanger 110 includes a housing 105 having a main fuel flow inlet 125, a main fuel flow outlet 127, and de-oxygenated fuel inlet 113. In general, heat-sink heat exchanger 110 can be used to reach higher fuel temperatures (greater than 350° F.) than traditional systems to increase the fuel bulk temperature, thereby improving efficiency. Heat-sink heat exchanger 110 includes a main fuel input flow path 115. De-oxygenated fuel inlet 113 opens into main fuel input flow path 115 forming a barrier along an interior surface 117 of flow path 115. Coking (e.g., diffusing and adhering of insoluble fuel elements to walls) along main fuel input flow path 115 associated with the increased fuel temperatures is mitigated by the barrier formed with de-oxygenated fuel stream 138 being input at inlet 113.

As shown in FIG. 2, fuel nozzle 101 includes a housing 103 defining a longitudinal axis A having a main fuel flow inlet 120, main fuel flow outlet 122, and at least one de-oxygenated fuel inlet 116. Main fuel inlet 120 and outlet 122 define a main fuel flow path 126 therebetween. De-oxygenated fuel inlets 116 are in fluid communication with main fuel flow path 126 downstream from main fuel inlet 120. De-oxygenated fuel inlets 116 is configured and adapted to supply a de-oxygenated fuel stream 138 to the main fuel flow path 126 via de-oxygenated fuel flow conduits 124 to mitigate insoluble fuel elements 118 in main fuel stream 129 from diffusing and adhering to an interior surface 134 of an orifice wall 136 of housing 103. De-oxygenated fuel stream 138 forms a barrier between the main fuel stream 129 and the walls of the orifice, thereby displacing main fuel stream 129 and the insoluble particles away 118 from interior surface 134 of orifice wall 136, preventing and/or reducing diffusing and adhering to interior surface 134.

Figure 3:
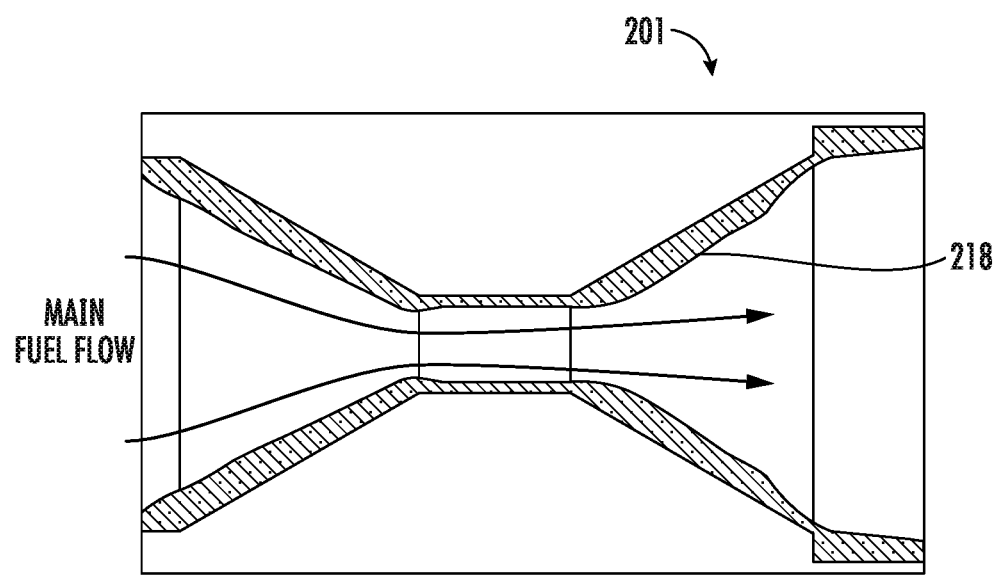
FIG. 3 is a schematic depiction of a traditional fuel nozzle, showing the potential coking deposits.

With continued reference to FIG. 2, de-oxygenated fuel flow conduits 124 open into, by way of example, a converging portion 130 of the fuel nozzle and/or a neck portion 128 of the fuel nozzle 101 at outlets 121. The conduits 124 could open into the diverging portion 132, as well, this is shown schematically by optional conduit 139 shown in broken lines, and anywhere in the fuel system which are at risk of coking formation. Neck portion 128 has a generally constant width (w) that is smaller than a width in an upstream portion (e.g., converging portion 130) of nozzle 101 and a width in the downstream portion (e.g. diverging portion 132) of nozzle 101. Converging portion 130, neck portion 128 and diverging portion 132 form a metering orifice in fuel nozzle 101 right before the fuel enters combustor 108. Similar metering orifices can be found upstream fuel metering devices as well. Insoluble coking deposits 118 in main fuel stream 129 tend to diffuse and adhere to wall 136 of fuel system at the narrow points along the orifice or just downstream thereof making the introduction of de-oxygenated fuel stream 138 at the neck portion 128 or just before (along the converging wall of converging portion 130) beneficial. Due to its proximity to combustor 108, fuel nozzles 101 have the highest temperature and smallest passages in a fuel system, and hence most prone to coking deposition. For reference, FIG. 3 shows a traditional nozzle 201 (without de-oxygenated fuel inlets 116) having a coking deposition layer 218 formed on a wall.

With reference now to FIGS. 1 and 2, a method for mitigating coking in a fuel supply system, e.g., fuel supply system 100, includes providing a first portion of fuel from a fuel tank, e.g., a fuel tank 102, to an oxygen removal system, e.g., oxygen removal system 106, and a second portion of fuel from the fuel tank to an inlet, e.g., main fuel flow inlet 125, of a fuel supply component, e.g., the heat-sink heat exchanger 110. The first portion of fuel that is de-oxygenated is less than the second portion of fuel. The method includes de-oxygenating the first portion of fuel with the oxygen removal system to generate a de-oxygenated fuel stream, e.g., de-oxygenated fuel stream 138. The method includes providing the de-oxygenated fuel stream to a de-oxygenated fuel inlet, e.g., de-oxygenated fuel inlet 113, of the heat-sink heat exchanger, and/or a de-oxygenated fuel inlet, e.g., de-oxygenated fuel inlet 116, of another fuel supply component, e.g., a fuel nozzle 101. It is contemplated that in some embodiments, the heat-sink heat-exchanger 110 would not be present. For the main fuel supply flow path, e.g. flow path 126, the fuel nozzle is positioned downstream from the heat-sink heat exchanger. Both the fuel nozzle and the heat-sink heat exchanger are downstream from the oxygen removal system. In both the heat-sink heat exchanger and the fuel nozzle, the de-oxygenated fuel stream generates a barrier of de-oxygenated fuel along their respective housing walls, e.g. an interior surface 134 of a wall 136 of housing 103 of nozzle 101, or an interior surface of a wall of main fuel input flow path 115 (which could be a conduit, or the like), thereby reducing and/or preventing insoluble fuel elements from the second portion of fuel (the non-de-oxygenated portion) from diffusing and adhering to their respective housing walls.

The methods and systems of the present disclosure, as described above and shown in the drawings, provide for fuel supply systems with superior properties including the ability to operate with higher fuel temperatures, and/or reducing fuel coking along various fuel supply components. The systems and methods of the present invention can apply to passages in heat exchangers, nozzles or the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel supply component with coking mitigation, the fuel supply component comprising:
a housing including a main fuel inlet, and a main fuel outlet defining a main fuel flow path therebetween, wherein the housing includes a de-oxygenated fuel inlet in fluid communication with the main fuel flow path downstream from the main fuel inlet, and wherein the de-oxygenated fuel inlet is configured and adapted to supply de-oxygenated fuel to the main fuel flow path to mitigate insoluble fuel elements from diffusing and adhering to walls of the fuel system component, wherein the fuel supply component is downstream from an oxygen removal unit, a fuel tank, and a fuel pump assembly and the oxygen removal unit is downstream from the fuel tank and the fuel pump assembly, such that the oxygen removal unit is configured and adapted to receive the de-oxygenated fuel from the fuel pup assembly which receive the de-oxygenated fuel from the fuel tank and supply it to the de-oxygenated fuel inlet to mitigate insoluble fuel elements from diffusing and adhering to walls of the fuel system component.

2. The fuel supply component as recited in claim 1, wherein the fuel supply component is at least one of a heat exchanger or a fuel nozzle.

3. The fuel supply component as recited in claim 1, wherein the fuel supply component is a fuel nozzle, wherein the de-oxygenated fuel inlet is in fluid communication with at least one de-oxygenated fuel conduit which opens into at least one of a converging portion of the fuel nozzle, a neck portion of the fuel nozzle, or a diverging portion of the fuel nozzle, wherein the neck portion has a smaller radial dimension than an upstream portion of the fuel supply component and a downstream portion of the fuel supply component.

4. The fuel supply component as recited in claim 1, wherein the fuel supply component is a heat-sink heat exchanger having a main fuel input flow path, wherein the de-oxygenated fuel inlet opens into the main fuel input flow path.

5. A fuel supply system with coking mitigation, the fuel supply system comprising:
a fuel tank;
a fuel pump assembly downstream from the fuel tank;
an oxygen removal system downstream from the fuel tank configured and adapted to receive and de-oxygenate a portion of fuel from the fuel pump assembly, which receives the de-oxygenated fuel form the fuel tank;
a fuel supply component downstream from the oxygen removal system and the fuel tank, wherein the fuel supply component includes a housing having a main fuel flow inlet and at least one de-oxygenated fuel inlet, and wherein the de-oxygenated fuel inlet is configured and adapted to supply de-oxygenated fuel to mitigate insoluble fuel elements from diffusing and adhering to walls of the fuel system component.

6. The system as recited in claim 5, wherein the fuel supply component is at least one of a heat exchanger or a fuel nozzle.

7. The system as recited in claim 5, further comprising a second fuel supply component downstream from the oxygen removal system and the fuel tank, wherein the first fuel supply component is a heat exchanger and wherein the second fuel supply component is a fuel nozzle.

8. The system as recited in claim 5, wherein the fuel supply component is a fuel nozzle, wherein the de-oxygenated fuel inlet is in fluid communication with at least one de-oxygenated fuel conduit which opens into at least one of a converging portion of the fuel nozzle, or a neck portion of the fuel nozzle, wherein the neck portion has a smaller radial dimension than an upstream portion of the fuel supply component and a downstream portion of the fuel supply component.

9. The system as recited in claim 5, wherein the fuel supply component is a heat-sink heat exchanger having a main fuel input flow path, wherein the at least one de-oxygenated fuel inlet opens into the main fuel input flow path.

10. A method for mitigating coking in a fuel supply system, the method comprising:
providing a first portion of fuel from a fuel tank to a fuel pump assembly and then to an oxygen removal system and a second portion of fuel from the fuel tank to the fuel pump assembly and then to a fuel supply component, wherein the oxygen removal unit is downstream from the fuel tank and the fuel pump assembly and is configured and adapted to receive and de-oxygenate the first portion of fuel from the fuel pump assembly, wherein the fuel supply component is downstream from the oxygen removal system and the fuel pump assembly;
de-oxygenating the first portion of fuel with the oxygen removal system to generate a de-oxygenated fuel stream;
providing the de-oxygenated fuel stream to a de-oxygenated fuel inlet of the fuel supply component, wherein the fuel supply component includes a housing having a main fuel flow inlet and the de-oxygenated fuel inlet; and
providing the second portion of fuel to the main fuel flow inlet of the housing, wherein the de-oxygenated fuel stream is configured to generate a barrier of de-oxygenated fuel within the housing mitigate insoluble fuel elements from the second portion of fuel from diffusing and adhering to walls of the fuel system component.

11. The method as recited in claim 10, wherein the first portion of fuel is less than the second portion of fuel.

12. The method as recited in claim 10, wherein the fuel supply component is at least one of a heat exchanger or a fuel nozzle.

13. The method as recited in claim 10, wherein the fuel supply component is a first fuel supply component, the method further comprising providing a second fuel supply component downstream from the oxygen removal system with a portion of the de-oxygenated fuel stream.

14. The method as recited in claim 13, wherein the first fuel supply component is a heat exchanger and wherein the second fuel supply component is a fuel nozzle.

\* \* \* \* \*